(12) United States Patent
Sugawara et al.

(10) Patent No.: US 11,647,535 B2
(45) Date of Patent: May 9, 2023

(54) WIRELESS TRANSMITTING DEVICE AND WIRELESS TRANSMITTING METHOD

(71) Applicant: YAMAHA CORPORATION, Hamamatsu (JP)

(72) Inventors: Toshiyuki Sugawara, Kakegawa (JP); Hirokazu Suzuki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 205 days.

(21) Appl. No.: 17/064,015

(22) Filed: Oct. 6, 2020

(65) Prior Publication Data
US 2021/0105798 A1    Apr. 8, 2021

(30) Foreign Application Priority Data

Oct. 8, 2019  (JP) .............................. JP2019-185504

(51) Int. Cl.
*H04W 72/00* (2023.01)
*H04W 72/566* (2023.01)
(Continued)

(52) U.S. Cl.
CPC ......... *H04W 72/569* (2023.01); *H04L 5/0055* (2013.01); *H04W 4/06* (2013.01);
(Continued)

(58) Field of Classification Search
None
See application file for complete search history.

(56) References Cited

U.S. PATENT DOCUMENTS 7,392,037 B2   6/2008  Qi
10,251,202 B2  4/2019  Minamiyama
(Continued)

FOREIGN PATENT DOCUMENTS

CN    101243673 A    8/2008
CN    105706496 A    6/2016
(Continued)

OTHER PUBLICATIONS

IEEE Std 802.11e™-2005, Part 11: Wireless LAN Medium Access Control (MAC) and Physical Layer (PHY) specifications Amendment 8: Medium Access Control (MAC) Quality of Service Enhancements, Nov. 11, 2005 (Year: 2005).*
(Continued)

*Primary Examiner* — Alex Skripnikov
(74) *Attorney, Agent, or Firm* — Rossi, Kimms & McDowell LLP (57) ABSTRACT

A wireless transmitting device includes a receiving circuit configured to receive a reception frame from another device, and a transmitting circuit configured to transmit a broadcast transmission frame while the receiving circuit is not receiving the reception frame, and controls the transmitting circuit to delay transmission of the broadcast transmission frame for a waiting period that starts from an end of reception of the reception frame according to a frame type of the transmission frame, including a broadcast frame, a unicast frame, and a reception acknowledgement response frame, wherein the waiting period for the broadcast frame is shorter than the waiting period for the unicast frame and longer than the waiting period for the reception acknowledgement response frame.

18 Claims, 9 Drawing Sheets

(51) Int. Cl.
   *H04L 5/00*       (2006.01)
   *H04W 4/06*       (2009.01)
   *H04W 72/0446*    (2023.01)
   *H04W 74/08*      (2009.01)
   *H04W 84/12*      (2009.01)
   *H04W 72/50*      (2023.01)

(52) U.S. Cl.
   CPC ..... *H04W 72/0446* (2013.01); *H04W 72/535* (2023.01); *H04W 74/0833* (2013.01); *H04W 84/12* (2013.01)

(56) References Cited

U.S. PATENT DOCUMENTS

| | | | |
|---|---|---|---|
| 2005/0243795 A1* | 11/2005 | Kim | H04B 7/2643 370/347 |
| 2012/0239772 A1 | 9/2012 | Kubota | |
| 2016/0277196 A1 | 9/2016 | Jose | |
| 2017/0026162 A1 | 1/2017 | Nabetani | |
| 2021/0185612 A1 | 6/2021 | Song | |

FOREIGN PATENT DOCUMENTS

| | | |
|---|---|---|
| CN | 111527771 A | 8/2020 |
| JP | 2016192664 A | 11/2016 |
| JP | 2018514752 A | 6/2018 |
| WO | 2019088645 A1 | 5/2019 |

OTHER PUBLICATIONS

Extended European Search Report issued in European Appln. No. 20200313.3 dated Jan. 14, 2021.

Sung. "Prioritized MAC Access Mechanism of Routing-related Frame for ESS Mesh." Samsung Electronics. Mar. 2004.

Office Action issued in Chinese Appln. No. 202011048691.4 dated Sep. 29, 2021. Partial English translation provided.

* cited by examiner

WIRELESS TRANSMITTING DEVICE AND WIRELESS TRANSMITTING METHOD

CROSS-REFERENCE TO RELATED APPLICATION

The present application claims priority from Japanese application JP2019-185504 filed on Oct. 8, 2019, the content of which is hereby incorporated by reference into this application.

BACKGROUND

1. Technical Field

The present invention relates to a wireless transmitting device and a wireless transmitting method.

2. Description of the Related Art

Wireless LANs are used in various locations. In wireless LAN communication, broadcast packets including SSID and ARP are transmitted through a wireless LAN access point. The broadcast packets are sent to all wireless LAN clients.

JP2018-514752A discloses measuring a distance between a plurality of wireless devices using broadcast messages sent by the wireless devices.

SUMMARY

The inventors are considering transmitting more extensive data in wireless LAN broadcasts. In wireless LANs, when normal unicast frames and broadcast frames are transmitted over the same frequency band, priority control between unicast and broadcast is difficult. As such, it is difficult to stably transmit high-priority data, such as emergency broadcast.

One or more embodiments of the present invention have been conceived in view of the above, and an object thereof is to provide a technique that enables data to be transmitted through wireless LAN broadcast according to priorities of the data.

In order to solve the above described problems, a wireless transmitting device according to one embodiment of the present invention includes a receiving circuit configured to receive a reception frame from another device, a transmitting circuit configured to transmit a transmission frame while the receiving circuit is not receiving the reception frame from the another device; at least one memory storing instructions, and at least one processor that implements the instructions to execute a plurality of tasks, including a controlling task that, in a case where the reception frame is being received from the another device, controls the transmitting circuit to delay transmission of the transmission frame for a waiting period that starts from an end of reception of the reception frame according to a frame type of the transmission frame, including a broadcast frame, a unicast frame, and a reception acknowledgement response frame. The waiting period for the broadcast frame is shorter than the waiting period for the unicast frame and longer than the waiting period for the reception acknowledgement response frame.

A wireless transmitting method according to one embodiment of the present invention includes receiving a reception frame from another device, transmitting a transmission frame while the receiving is not receiving the reception frame from the another device, and delaying, in a case where the reception frame is being received from the another device, transmission of the transmission frame for a waiting period that starts an end of reception of the reception frame, according to a frame type of the transmission frame, including a broadcast frame, a unicast frame, and a reception acknowledgement response frame. The waiting period for the broadcast frame is shorter than the waiting period for the unicast frame and longer than a waiting period for the reception acknowledgement response frame.

Another wireless transmitting device according to one embodiment of the present invention includes a receiving circuit configured to receive a reception frame from another device, a transmitting circuit configured to transmit a broadcast transmission frame, while the receiving circuit is not receiving the reception frame from the another device, at least one memory storing instructions, and at least one processor that implements the instructions to control the transmitting circuit, in a case where the reception frame is being received from the another device, to delay transmission of the broadcast transmission frame for a waiting period that starts from an end of reception of the reception frame. The waiting period is shorter than a sum of Distributed Coordination Function Inter Frame Space (DIFS) and random backoff in IEEE802.11 standard and longer than Short Inter Frame Space (SIFS) in IEEE802.11 standard.

According to the present invention, it is possible to transmit data to be transmitted through wireless LAN broadcast according to priorities of the data.

DETAILED DESCRIPTION

An embodiment of the present invention will be described below with reference to the accompanying drawings. In this embodiment, a wireless communication system for transmitting and receiving broadcast frames and unicast frames in the same frequency band will be described. Unless otherwise stated, the wireless communication system transmits and receives data in accordance with IEEE802.11.

Figure 1:
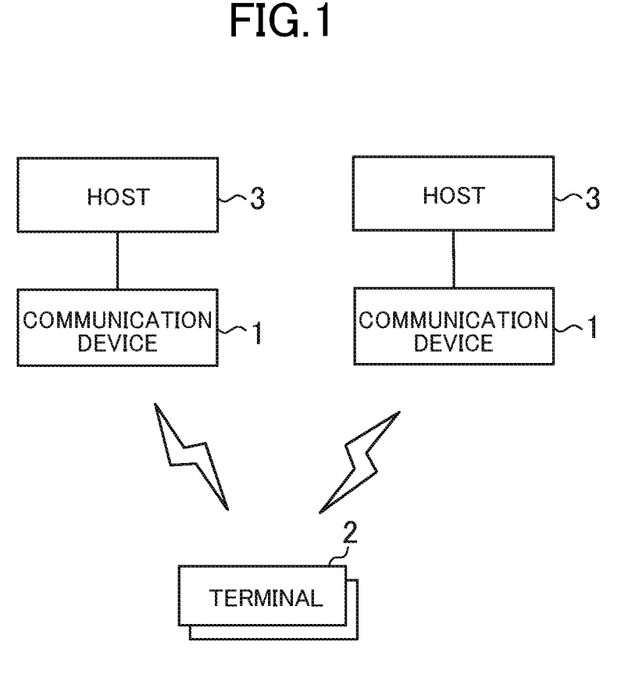
FIG. 1 is a diagram illustrating an example of a wireless communication system according to an embodiment of the present invention.

FIG. 1 is a diagram illustrating an example of the wireless communication system according to the present embodiment. The wireless communication system includes a plurality of communication devices 1, one or more terminals 2, and a plurality of hosts 3. The host 3 stores transmission data for transmission by broadcast, and delivers the transmission data to the communication device 1. The host 3 may deliver the transmission data to be transmitted by unicast to the communication device 1.

The unicast means that the communication device 1 and the terminal 2 transmit and receive data one-to-one, and a frame to be transmitted including such data is called a unicast frame. The broadcast means transmitting the same data from the communication device 1 to a plurality of terminals 2 at a time, and a frame to be transmitted including such data is called a broadcast frame. The communication device 1 and the terminal 2 that have received the unicast frame make a response (acknowledgment response) indicating that they have received the frame. A frame transmitted in the response is called an ACK frame. In the following, a frame to be transmitted by the communication device 1 is referred to as a transmission frame, and a frame to be received by the communication device 1 is referred to as a reception frame. The transmission frame and the reception frame are either a unicast frame, a broadcast frame, or an ACK frame. In the present embodiment, a frame is a type of signal wirelessly transmitted or received in a certain frequency band. A frame is transmitted or received for a period of time depending on the data carried by the frame.

The communication device 1 is, for example, a wireless LAN access point, and is a form of a wireless transmitting device capable of wirelessly transmitting unicast frames and broadcast frames in accordance with IEEE802.11. In particular, a wireless communication system in which broadcast transmission is wirelessly performed will be described below.

Each of the one or more terminals 2 includes a wireless LAN client. The terminal 2 is, for example, a personal computer or a smartphone, and can communicate with the communication device 1 in accordance with IEEE802.11. Here, the communication device 1 mainly transmits data, the terminal 2 receives the data, although the terminal 2 may transmit the data and the communication device 1 may receive the data.

Figure 2:
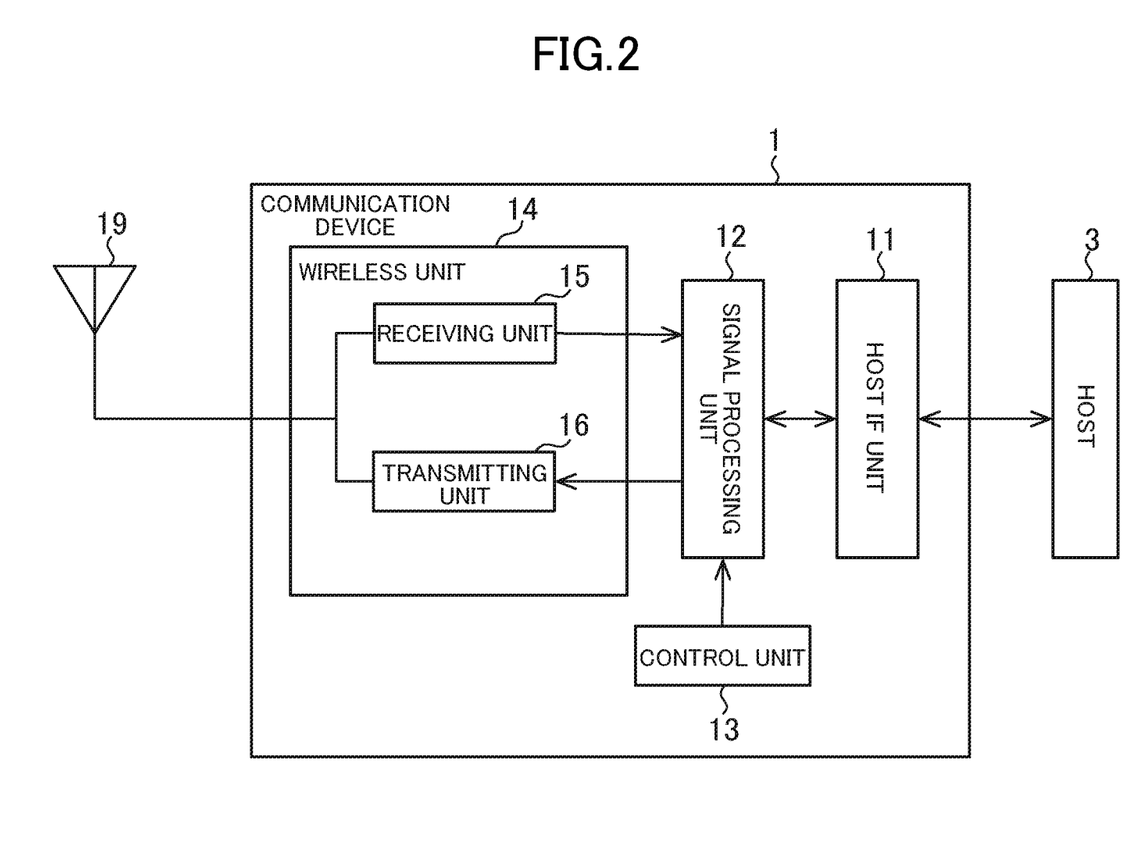
FIG. 2 is a block diagram illustrating a configuration of a communication device.
Figure 9:
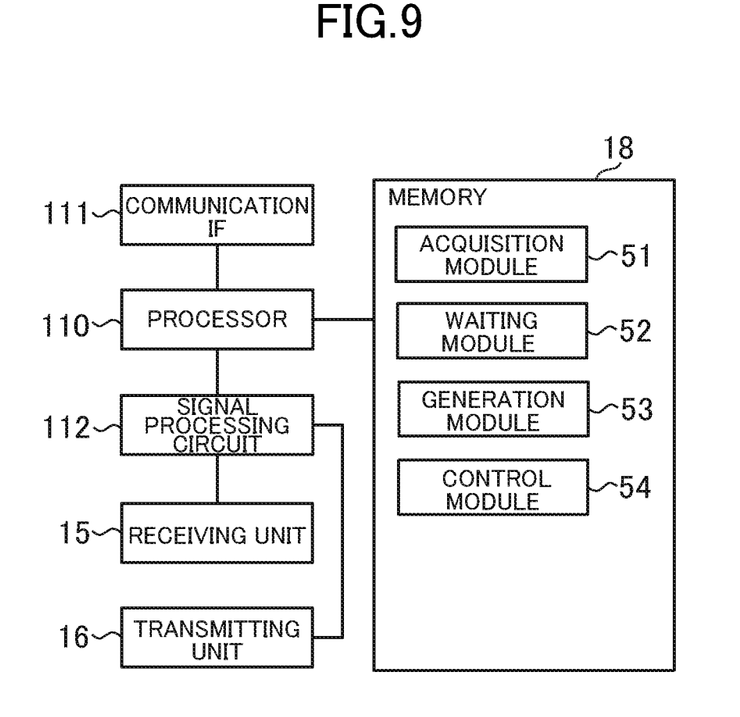
FIG. 9 is a block diagram illustrating an example of a hardware configuration of the communication device and programs stored in a memory.

FIG. 2 is a block diagram illustrating a configuration of the communication device 1. The communication device 1 includes a host IF unit 11, a signal processing unit 12, a control unit 13, and a wireless unit 14. The wireless unit 14 includes a receiving unit 15 and a transmitting unit 16, and the receiving unit 15 and the transmitting unit 16 are connected to an antenna 19. The antenna 19 may be incorporated in the communication device 1, or connected to the outside of the communication device 1. FIG. 9 is a block diagram illustrating an example of a hardware configuration of the communication device 1 and programs stored in the memory 18. The communication device 1 includes a processor 110, a communication IF 111, a signal processing circuit 112, and the memory 18 in addition to the receiving unit 15 and the transmitting unit 16. The memory 18 stores programs of an acquisition module 51, a waiting module 52, a generation module 53, and a control module 54. The communication IF 111 is an interface for communication, such as Ethernet (registered trademark), and the signal processing circuit 112 is a circuit for generating baseband signals.

The host IF unit 11 physically includes the communication IF 111 such as Ethernet and the processor 110. When the processor 110 executes the acquisition module 51, the host IF unit 11 thereby acquires the transmission data from the host 3 and delivers the reception data to the host 3. The transmission data is to be transmitted wirelessly, and the reception data is to be received wirelessly. The host IF unit 11 stores the transmission data acquired from the host 3 in a buffer memory. Before storing the transmission data from the host 3 in the buffer memory, the host IF unit 11 optionally converts a communication protocol of the transmission data from the host 3 to a communication protocol suitable for transmission of the wireless LAN. The host IF unit 11 sequentially outputs the transmission data stored in the buffer memory to the signal processing unit 12.

The receiving unit 15 and the transmitting unit 16 included in the wireless unit 14 are composed of a so-called high-frequency circuit. The receiving unit 15 demodulates radio waves received by the antenna 19, and generates a demodulated signal. The receiving unit 15 enters the generated demodulated signal to the signal processing unit 12.

The transmitting unit 16 modulates the baseband signal entered from the signal processing unit 12, and generates a high-frequency signal. The transmitting unit 16 outputs the generated high-frequency signal to the antenna 19 so that the antenna 19 outputs a radio wave corresponding to the high-frequency signal.

The signal processing unit 12 physically includes the processor 110 and the signal processing circuit 112. The signal processing unit 12 and the host IF unit 11 may be configured by the same processor 110. When the processor 110 executes the generation module 53, the signal processing unit 12 thereby generates data of a transmission frame based on the transmission data entered from the host IF unit 11. The signal processing circuit of the signal processing unit 12 converts the data of the generated transmission frame into a baseband signal of the transmission frame, and outputs the baseband signal to the transmitting unit 16.

The signal processing unit 12 generates data of the reception frame from the demodulated signal entered from the receiving unit 15. The signal processing unit 12 then outputs the reception data included in the data of the reception frame to the host IF unit 11. Further, the signal processing unit 12 monitors the reception frame by the processor 110 executing the waiting module 52. More specifically, the signal processing unit 12 monitors whether the signal of the reception frame is currently transmitted from the other communication device 1 and terminal 2, or whether transmission is currently put on hold.

Figure 3:
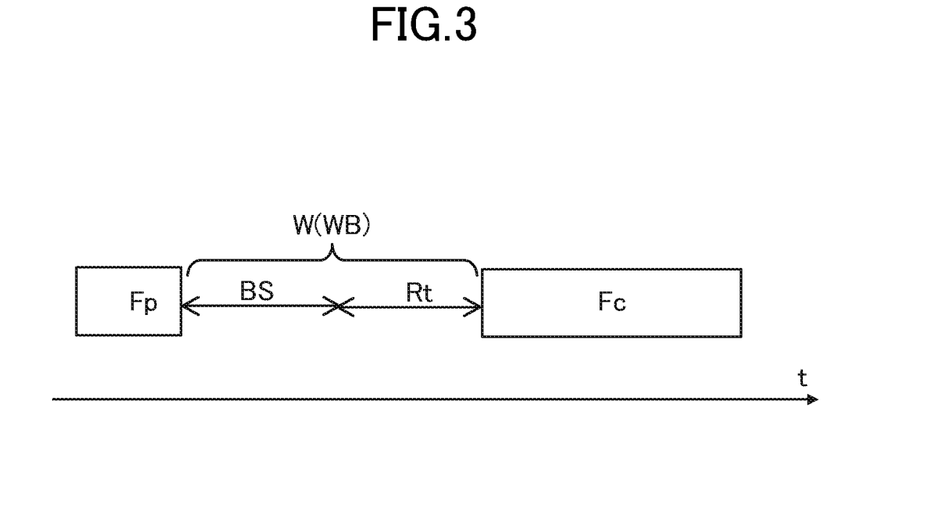
FIG. 3 is a diagram illustrating a waiting period between frames.

Putting transmission on hold will be described in more detail. Putting transmission on hold is performed by the processor 110 executing the waiting module 52. FIG. 3 is a diagram illustrating a waiting period between frames. The frames Fp and Fc shown in FIG. 3 indicate frames that are transmitted as a radio wave to the space in a certain frequency band. The frame Fc transmitted by the communication device 1 is transmitted after the waiting period W has elapsed since the transmission of the previous frame Fp is completed. In the example of FIG. 3, the frame Fc is a broadcast frame. The waiting period WB in the broadcast frame is the sum of basic time BS and random time Rt. The basic time BS is a period determined according to the priority of the broadcast, and the random time Rt changes randomly for each transmission of a frame. The random time Rt is a period randomly determined within a certain range.

The frame Fp may be a broadcast frame, a unicast frame, or an ACK frame. Upon detecting a reception frame from another device during the waiting period W, the signal processing unit terminates the waiting period W, waits for the end of transmission of the frame, and again waits during the waiting period W. The reception frame is received and demodulated by the receiving unit 15. The waiting period W from the end of the transmission of the frame Fp to the transmission of the next frame Fc is provided, and the waiting period W is set to the sum of the basic time BS and the random time Rt, which is different for each device. This prevents a plurality of communication devices 1 and terminals 2 from transmitting frames simultaneously, thereby preventing communication problems.

If the frame Fc is a unicast frame, the signal processing unit 12 waits during DIFS (DCF Inter Frame Space) in IEEE802.11 standard instead of the basic time BS, and waits during a random backoff Rb in IEEE802.11 standard instead of the random time Rt. The waiting period WD in this case is the sum of the DIFS and the random backoff Rb. The DIFS and the random backoff Rb respectively correspond to the basic time BS and the random time Rt of the waiting period WB. The DIFS is a predetermined period, and the random backoff R b is a randomly determined period. If the frame Fc is an ACK frame, the signal processing unit 12 waits during the waiting period WA of the unicast frame. The waiting period WA is SIFS (Short Inter Frame Space) in IEEE802.11 standard and is a predetermined period. There is no period corresponding to the random time Rt in the waiting period WA.

The control unit 13 physically includes the processor 110. The processor 110 executes the control module 54, whereby the control unit 13 sets a parameter related to the waiting period WB used by the signal processing unit 12 based on the priorities of the broadcast frames set by the user. The host IF unit 11, the signal processing unit 12, and the control unit 13 may be housed in the same integrated circuit package. In addition, the wireless unit 14 may be housed in the same integrated circuit package. Some of the functions of the host-IF unit 11, the signal processing unit 12, and the control unit 13 may be implemented in software by the processor.

In the present embodiment, the priority of the broadcast frame is improved by making the waiting period WB for the broadcast frame shorter than the waiting period WD for the unicast frame. Hereinafter, the control at the time of transmission will be described in detail.

Figure 4:
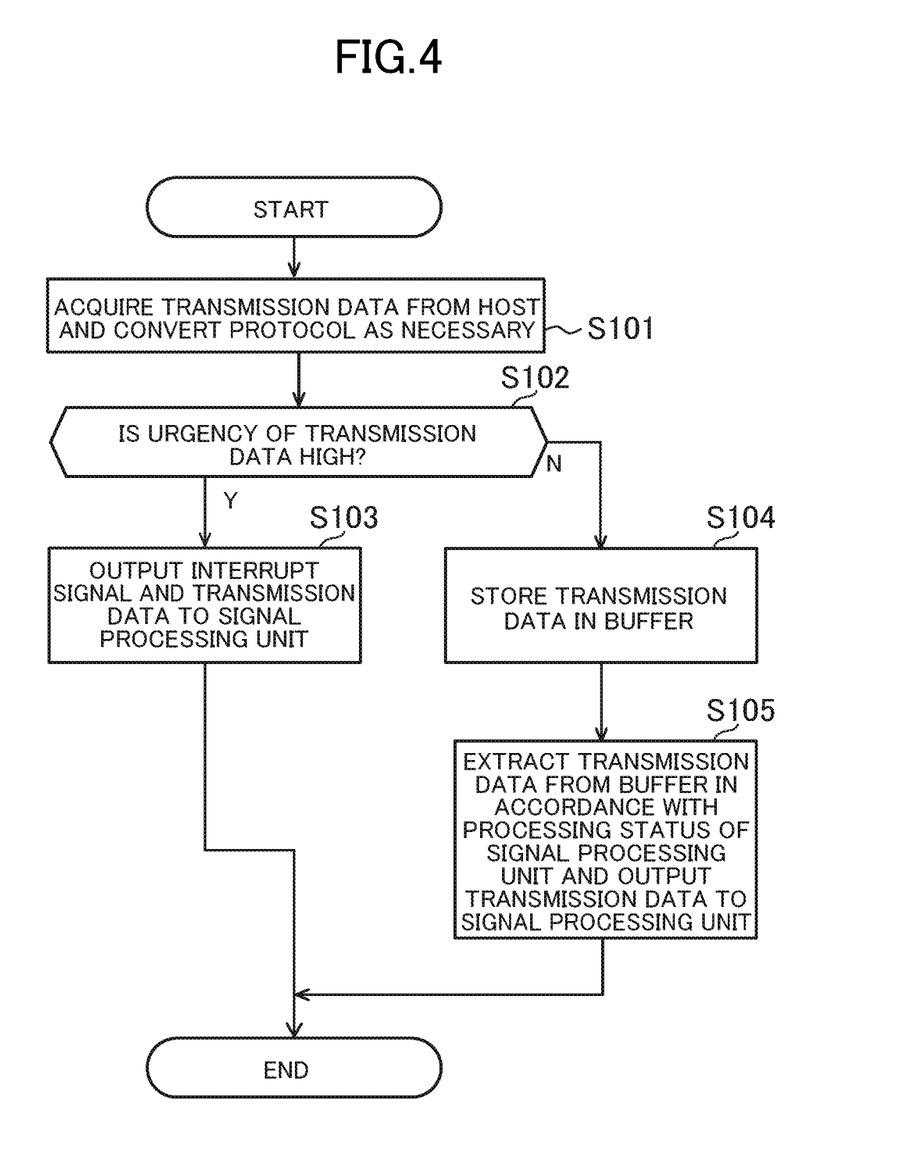
FIG. 4 is a flow chart showing an example of processing of a host-IF unit.

FIG. 4 is a flow chart showing an example of processing of the host-IF unit 11, and an example of processing when data is transmitted wirelessly. FIG. 4 shows processing by the acquisition module 51. The host IF unit 11 acquires data to be transmitted (transmission data) from the host 3. If the communication protocol of the acquired transmission data is not suitable for transmission by the wireless LAN, the host IF unit 11 converts the transmission data to a communication protocol suitable for transmission (step S101). The host IF unit 11 determines urgency of the acquired transmission data based on a type of the transmission data (step S102). For example, if the type of transmission data is emergency broadcast, the host IF unit 11 determines that the urgency is high.

If the urgency of the transmission data is low (N in the step S102), the acquired transmission data is stored in the buffer (step S104). On the other hand, if the urgency of the transmission data is high (Y in the step S102), an interrupt signal and the transmission data are output to the signal processing unit 12 (step S103). The interrupt signal allows the signal processing unit 12 to preferentially transmit the transmission data.

When the transmission data is stored in the buffer, the host-IF unit 11 extracts the transmission data from the buffer in accordance with the processing status of the signal processing unit 12, and outputs the transmission data to the signal processing unit 12 (step S105). In FIG. 4, the processing of step S105 is performed after the processing of step S104, although the processing of step S105 may be performed periodically or performed each time the transmission data of the signal processing unit 12 is accepted.

Figure 5:
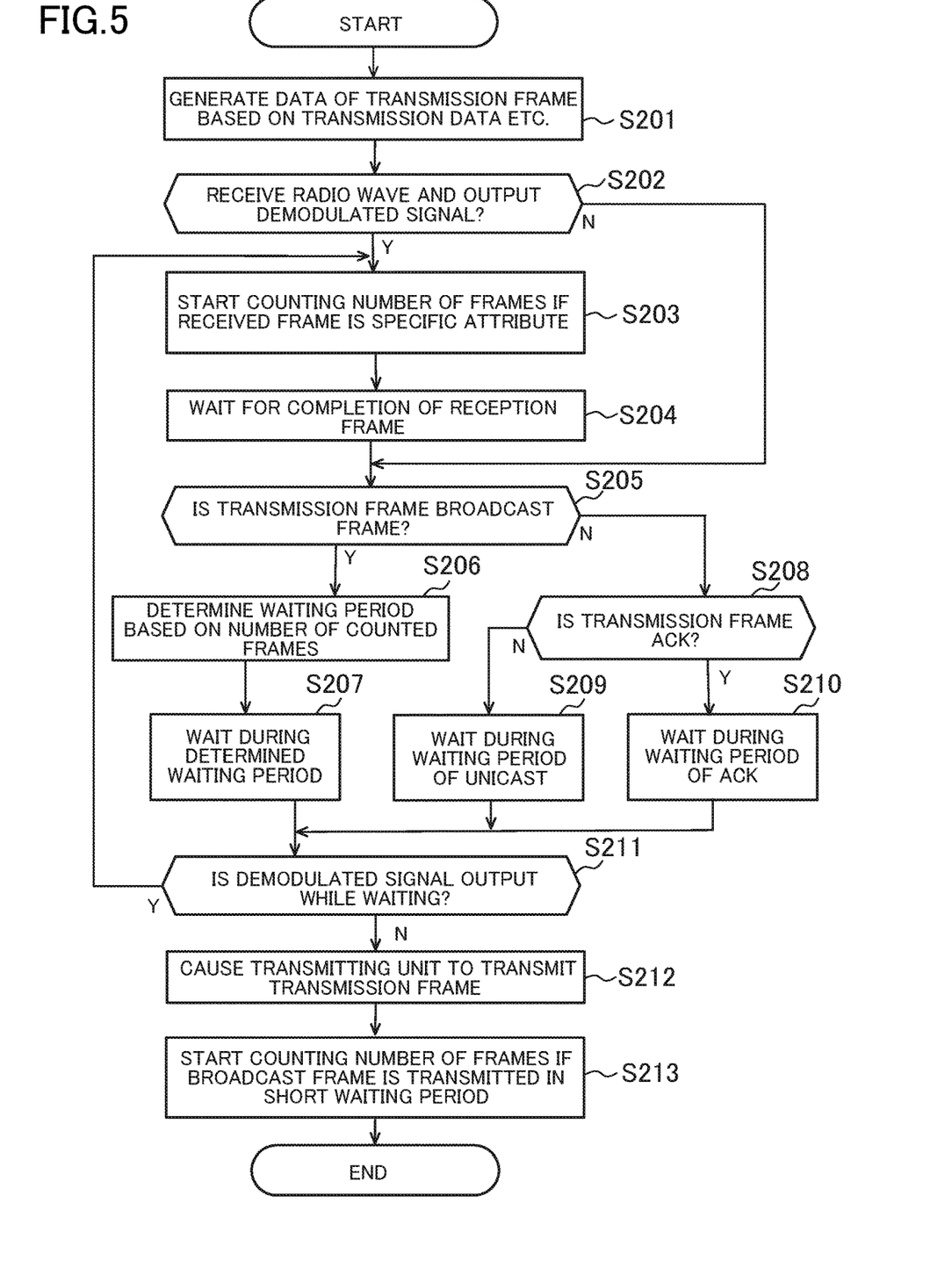
FIG. 5 is a flow chart illustrating an example of processing of a signal processing unit and a transmitting unit.

FIG. 5 is a flow chart illustrating an example of processing of the signal processing unit 12 and the transmitting unit 16. The signal processing unit 12 generates data of a frame to be transmitted based on the entered transmission data by executing the generation module 53 (step S201). There are three types of inputs of the transmission data: an input from the host IF unit 11 together with the interrupt signal; an input from the host IF unit 11 via the buffer; and an acknowledgment response (ACK) for the unicast frame received by this communication device 1. The ACK may be generated by the signal processing unit 12. Further, when generating data of the transmission frame, the signal processing unit 12 divides the transmission data into packet data, adds header information and an error correction code, and encrypts the packet data etc. as necessary. The signal processing unit 12 generates data of the transmission frame including the packet data, the header information, and the error correction code.

When the data of the transmission frame is generated, in order to confirm the radio wave condition of the space, the signal processing unit 12 determines whether the receiving unit 15 receives the radio wave including the data and a demodulated signal generated by demodulating such radio wave is output (step S202). The processing steps after S202 are performed by executing the waiting module 52. If the demodulated signal is output (Y in S202), the processing for synchronizing the timings at which the broadcast frames are transmitted with higher priority is executed. More specifically, the signal processing unit 12 generates data of a reception frame from the demodulated signal, and starts counting the number of frames according to the frame type of the reception frame (when the reception frame is a broadcast frame) (step S203). When the count is started, the number of frames increases each time a frame is received or transmitted.

If the demodulated signal is output (Y in step S202), the signal processing unit 12 waits for completion of reception of the reception frame (step S204). If the demodulated signal is not output (N in step S202), the signal processing unit 12 skips the processing of the steps s203 and S204.

The signal processing unit 12 then determines whether the data of the transmission frame is a broadcast frame (step S205). If the data of the transmission frame is a broadcast frame (Y in step S205), the signal processing unit 12 determines a waiting period WB based on the number of the counted frames (step S206). More specifically, if the number of the counted frames is a multiple of a predetermined number (e.g., 2), the signal processing unit 12 selects a value smaller than DIFS and greater than SIFS as a basic time BS, and calculates the sum of the random time Rt and the value as the waiting period WB. On the other hand, if the number of the counted frames is not a multiple of the predetermined number, the signal processing unit 12 calculates a waiting period WD as the waiting period W for this transmission frame, where the waiting period WD is the same waiting period WD as the unicast frame and, more specifically, the sum of DIFS and the random backoff Rb. The signal processing unit 12 waits during the determined waiting period (step S206).

If the transmission frame is an ACK frame (N in step S205 and Y in step S208), the signal processing unit 12 waits during a waiting period WA of the ACK frame (i.e., SIFS). If the transmission frame is a unicast frame (N in step S205 and N in step S208), the signal processing unit 12 waits during a waiting period WD of the unicast (step S209).

Here, the waiting period WB of the broadcast frame is longer than the waiting period WA of the ACK frame and shorter than the waiting period WD of the unicast frame. In other words, the following relation is satisfied:

SIFS<Basic Time BS+Random Time Rt<DIFS+Random Back-off Rb   (1)

There are the random time Rt and the random back-off Rb, and thus, when this relation always holds, the sum of the basic time BS and the maximum value of the random time Rt is smaller than the sum of the DIFS and the minimum value of the random back-off Rb. Needless to say, the sum of the basic time BS and the expected value of the random time Rt is smaller than the sum of the DIFS and the expected value of the random backoff Rb.

Further, SIFS<Basic Time BS<DIFS may be satisfied. The range of values of the random time Rt (minimum value and maximum value) and the probability distribution may be the same as the random backoff Rb.

The receiving unit 15 then receives the radio wave while waiting, and in a case where a demodulated signal is output (step S211), the processing after the step S203 is repeated. If the demodulated signal is not being received from the receiving unit (N in step S211), the signal processing unit 12 outputs a baseband signal to the transmitting unit 16 to cause the transmitting unit 16 to transmit the transmission frame (step S212). More specifically, the signal processing unit 12 generates a baseband signal from the data of the transmission frame, and enters the baseband signal to the transmitting unit 16. The transmitting unit 16 modulates the entered baseband signal and transmits the signal as a radio wave. If the broadcast frame is transmitted in a waiting period WB shorter than that of the unicast frame, the signal processing unit 12 starts counting the number of frames (step S213).

If an interrupt signal is entered from the host IF unit 11, the signal processing unit 12 returns to the step S201 even in the middle of processing. However, if transmission is performed in the step S212, the signal processing unit 12 may return to the step S201 after completion of the transmission. The processing related to the interrupt signal does not have to be executed. In FIG. 4, the step S102 may not be branched and the step S104 may be performed regardless of priorities.

Figure 6:
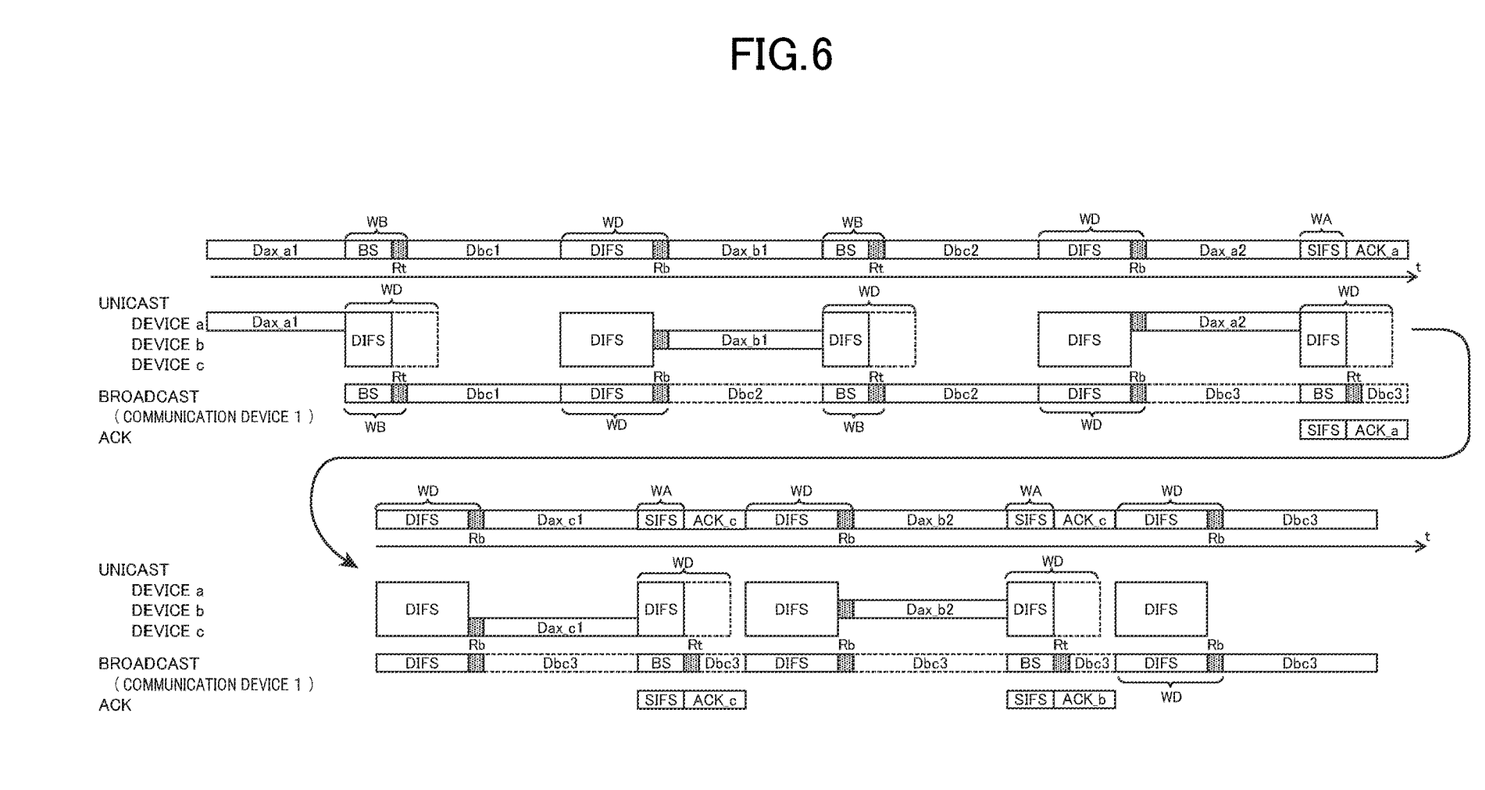
FIG. 6 is a diagram illustrating an example of a frame group transmitted and received in a certain frequency band.

Next, specific examples and effects of the operation of the communication device 1 according to the present embodiment will be described. FIG. 6 is a diagram illustrating an example of a frame group transmitted and received in a certain frequency band. In FIG. 6, the band above the time axis shows a frame being output to a certain frequency band and a waiting period W for the frame. Below the time axis, the transmission or waiting state of the unicast frame by device, the transmission or waiting state of the broadcast frame by the communication device 1, and the transmission or waiting state of the ACK frame are shown in order. The devices a to c transmit unicast frames. The communication device 1 is in the waiting period WB once every two times, and is in the waiting period WD in other times.

In the example of FIG. 6, the frame Dax_a1 is transmitted from the device a first, and when the transmission is completed, the devices a to c and the communication device 1 enters the waiting period W. Here, the waiting period WB in the broadcast frame is shorter than the waiting period WD of each of the devices a to c. As such, the frame Dbc1 is transmitted from the communication device 1, and the devices a to c wait for the end of the frame Dbc1. In the broadcast frame following the broadcast frame of the waiting period WB, the communication device 1 waits during the waiting period WD (i.e., the sum of the DIFS and the random back-off Rb) in the same manner as the other devices a to c, and thus the waiting period WD of the device b ends first and the frame Dax_b1 is transmitted from the device b.

After the end of the frame Dax_b1, there is the second frame from the end of the transmission of the previous broadcast frame. As such, the communication device 1 waits in the waiting period WB, and 1 transmits a broadcast frame Dbc2. Subsequently, the communication device 1 waits in the waiting period WD, and the device a transmits the frame Dax_a2. Then, the device that has received the frame Dax_a2 transmits an ACK frame ACK_a prior to the communication device 1 waiting in the waiting period WB. The communication device 1 then waits in the waiting period WD, the device c transmits the frame Dax_c1, and an ACK frame is transmitted in response to the frame Dax_c1. Subsequently, the device b transmits the frame Dax_b2 and an ACK frame ACK_b is transmitted in response to the frame Dax_b2. After the waiting period WD has elapsed, the communication device 1 transmits the frame Dbc3.

Figure 7:
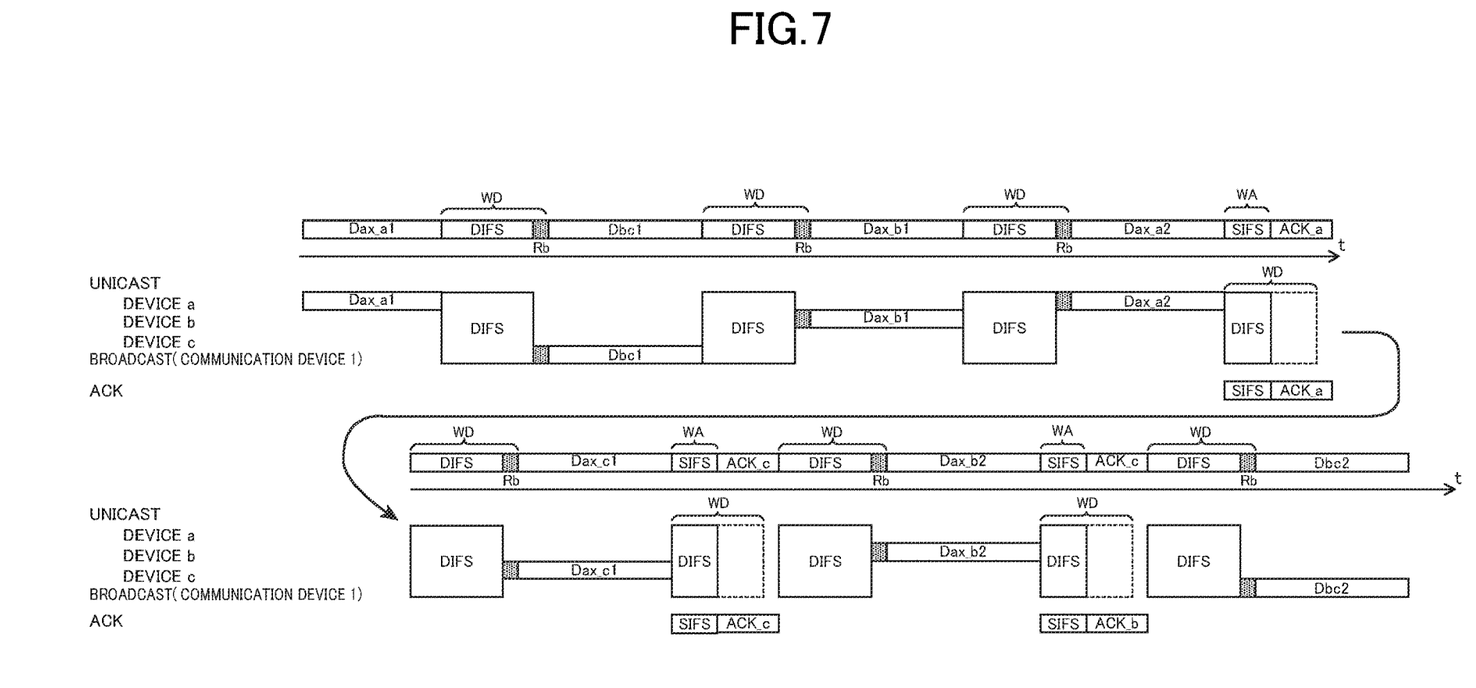
FIG. 7 is a diagram illustrating an example of comparison of frame groups transmitted and received in a certain frequency band.

FIG. 7 is a diagram illustrating an example of comparison of frame groups transmitted and received in a certain frequency band. In the example of FIG. 7, the broadcast frame is always transmitted in the waiting period WD. As such, if there are many devices that attempt to transmit a unicast frame, the amount of broadcast frames to be transmitted decreases.

As can be seen from the examples of FIGS. 6 and 7, the broadcast frame has priority over the unicast frame when waiting in the waiting period WB. This enables to more reliably transmit a broadcast frame.

As can be seen from FIG. 6, when the broadcast frame in the waiting period WB is transmitted, the signal processing unit 12 controls the next scheduled frame to wait during the waiting period WD or longer even if the next scheduled frame is a broadcast frame. More specifically, the signal processing unit 12 controls to hold the transmission of the broadcast frame in the waiting period WB once every plurality of times, and controls to hold the transmission of the broadcast frame in the waiting period WD in the other times. This enables to transmit a unicast frame even if the number of broadcast frames to be transmitted is very large.

In the example of FIG. 6, one communication device 1 transmits the broadcast frame, although a plurality of communication devices 1 may transmit the broadcast frame. In this case, by the processing of step S203 in FIG. 5, the plurality of communication devices 1 attempt to transmit the broadcast frame in the waiting period WB, which is shorter than the waiting period WD, at the same time. That is, when the other devices hold the transmission of the broadcast frame during the waiting period WD or longer, the signal processing unit 12 controls the communication device 1 to also hold the transmission of the broadcast frame during the waiting period WD or longer. As a result, when one communication device 1 transmits a broadcast frame in the waiting period WB, another device does not transmit a broadcast frame in the waiting period WB. This prevents a phenomenon in which unicast frames cannot be transmitted due to the increased priority of broadcast frames.

The phenomenon described above may be prevented in a manner different from the processing of the steps S203, S206, and S213 in FIG. 5. For example, transmission of a broadcast frame may satisfy the following relations:

$$\text{SIFS} < \text{Basic time } BS < \text{DIFS} \quad (2)$$

$$\text{Basic time } BS + (\text{Maximum value of random time } Rt) > \text{DIFS} + (\text{Minimum value of random back-off } Rb) \quad (3)$$

When the above conditions are satisfied, depending on the value of the random time Rt or random backoff Rb, a unicast frame may be transmitted even if a broadcast frame is waiting to be transmitted. This prevents a phenomenon in which unicast frames cannot be transmitted. Further, statistically, the transmission of the broadcast frame is prioritized. Assume that the sum of the basic time BS and the expected value of the random time Rt is smaller than the sum of the DIFS and the expected value of the random back-off Rb. In this regard, when usage that does not cause the phenomenon described above is assumed, the steps S203, S206, and S213 may not be simply performed.

Figure 8:
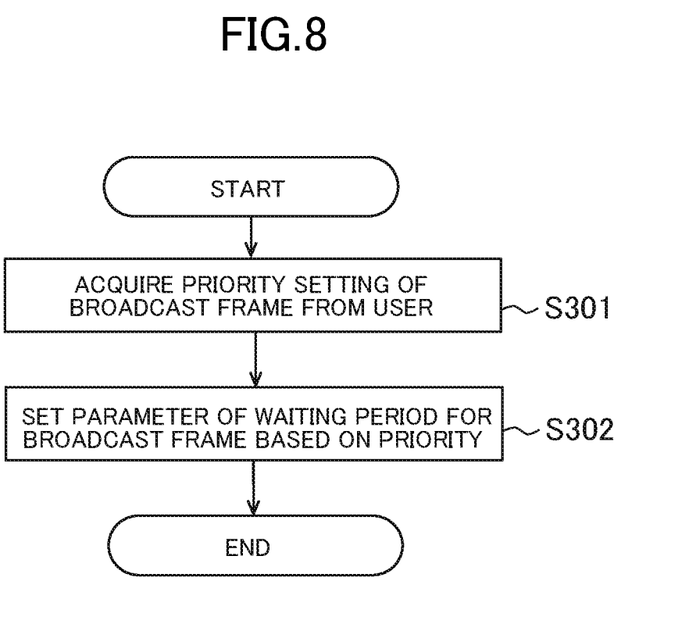
FIG. 8 is a flow chart showing an example of processing of a control unit.

In the following, the processing related to setting priorities will be described. FIG. 8 is a flow chart showing an example of the processing of the control unit 13. FIG. 8 shows processing by the acquisition module 51. The control unit 13 acquires priority setting of a broadcast frame from the user through a web interface or a command-based interface (step S301). The control unit 13 sets a parameter of the waiting period WB in the broadcast frame based on the acquired priority (step S302). For example, if the priority of the broadcast frame is determined to be high in the priority setting, the control unit 13 sets the basic time BS smaller than DIFS so as to satisfy the conditions (relations (1) or (2) and (3) etc.) of the waiting period WB described above. On the other hand, when the priority is determined to be low, the control unit 13 may set the same value for the basic time BS as the DIFS so that the broadcast frame is transmitted in the waiting period WD. In addition to the basic time BS, parameters of the frequency of transmitting the broadcast frame in the random time Rt and the waiting period WB may be changed.

Instead of acquiring the priority setting from the user, the control unit 13 may set a parameter so that the priority increases as the amount of transmission data accumulated in the buffer, which may be a queue, increases. More specifically, the control unit 13 may set the parameter so as to satisfy the condition of the waiting period WB when the transmission data accumulated in the buffers is larger than a threshold, and set the parameter such that the broadcast frame is put on hold during the waiting period WD when the transmission data is smaller than the threshold. Further, the control unit 13 may be set such that the more transmission data, the higher the ratio of broadcast frames. More specifically, the control unit 13 may change the parameter so that the frequency of transmission in the waiting period WB increases as the amount of transmission data increases, or may decrease the value of the basic time BS in the relations (2) or (3) so as to increase the probability that the broadcast frame is transmitted.

What is claimed is:

1. A wireless transmitting device comprising:
   a receiving circuit configured to receive a reception frame from another device;
   a transmitting circuit configured to transmit a broadcast transmission frame, while the receiving circuit is not receiving the reception frame from the another device;
   at least one memory storing instructions; and
   at least one processor that implements the instructions to control the transmitting circuit, in a case where the reception frame is being received from the another device, to delay transmission of the broadcast transmission frame for a waiting period that starts from an end of reception of the reception frame,
   wherein the waiting period is shorter than a sum of Distributed Coordination Function Inter Frame Space (DIFS) and random backoff in IEEE802.11 standard and longer than Short Inter Frame Space (SIFS) in the IEEE802.11 standard, and
   wherein the waiting period is a sum of a basic time and a random time of the broadcast transmission frame, and
   wherein a sum of the basic time and a maximum value of the random time of the broadcast transmission frame is smaller than the DIFS and greater than the SIFS.

2. A wireless transmitting device comprising:
   a receiving circuit configured to receive a reception frame from another device;
   a transmitting circuit configured to transmit a transmission frame while the receiving circuit is not receiving the reception frame from the another device;
   at least one memory storing instructions; and
   at least one processor that implements the instructions to execute a plurality of tasks, including a controlling task that, in a case where the reception frame is being received from the another device, controls the transmitting circuit to delay transmission of the transmission frame for a waiting period that starts from an end of reception of the reception frame according to a frame type of the transmission frame, including a broadcast frame, a unicast frame, and a reception acknowledgement response frame,
   wherein the waiting period for the broadcast frame is shorter than the waiting period for the unicast frame and longer than the waiting period for the reception acknowledgement response frame,
   wherein the waiting period for the broadcast frame is a sum of a basic time and a random time of the broadcast frame, and
   wherein a sum of the basic time and a maximum value of the random time of the broadcast frame is smaller than Distributed Coordination Function Inter Frame Space (DIFS) in IEEE802.11 standard and greater than Short Inter Frame Space (SIFS) in the IEEE802.11 standard.

3. The wireless transmitting device according to claim 2, wherein the waiting period for the unicast frame is a sum of a basic time and a random time of the unicast frame.

4. The wireless transmitting device according to claim 3, wherein the basic time and the random time of the unicast frame are the DIFS and random backoff in the IEEE802.11 standard, respectively.

5. The wireless transmitting device according to claim 4, wherein the waiting period for the reception acknowledgment response frame is the SIFS.

6. The wireless transmitting device according to claim 5, wherein the basic time of the broadcast frame is longer than the SIFS and shorter than the DIFS.

7. The wireless transmitting device according to claim 4, wherein the controlling task, in a state where the frame type of the transmission frame is the broadcast frame with the waiting period thereof that is shorter than the DIFS, even in a state where the frame type of a next transmission frame scheduled to be next is the broadcast frame, controls the waiting period for the next transmission frame to be equal to or longer than the waiting period for the unicast frame.

8. The wireless transmitting device according to claim 7, wherein the controlling task, in a state where the frame type of the received reception frame from the another device is the broadcast frame with the waiting period thereof that is shorter than the DIFS, even with the frame type of the next transmission frame being the broadcast frame, controls the waiting period for the next transmission frame to be equal to or longer than the waiting period for the unicast frame.

9. The wireless transmitting device according to claim 7, wherein controlling task controls the transmission circuit to delay the transmission of the broadcast transmission frame for longer than the waiting period for the unicast frame in accordance with a timing at which the another device delays transmission of a broadcast transmission frame for longer than the waiting period for the unicast frame.

10. The wireless transmitting device according to claim 2, wherein the reception acknowledgment response frame is an ACK frame in the IEEE802.11 standard.

11. A wireless transmitting method using a wireless transmitting device, the method comprising:
receiving a reception frame from another device;
transmitting a transmission frame while the receiving is not receiving the reception frame from the another device; and
delaying, in a case where the reception frame is being received from the another device, transmission of the transmission frame for a waiting period that starts from an end of reception of the reception frame according to a frame type of the transmission frame, including a broadcast frame, a unicast frame, and a reception acknowledgement response frame,
wherein the waiting period for the broadcast frame is shorter than the waiting period for the unicast frame and longer than a waiting period for the reception acknowledgement response frame,
wherein the waiting period for the broadcast frame is a sum of a basic time and a random time of the broadcast frame, and wherein a sum of the basic time and a maximum value of the random time of the broadcast frame is smaller than Distributed Coordination Function Inter Frame Space (DIFS) in IEEE802.11 standard and greater than Short Inter Frame Space (SIFS) in the IEEE802.11 standard.

12. The wireless transmitting method according to claim 11, wherein the waiting period for the unicast frame is a sum of a basic time and a random time of the unicast frame.

13. The wireless transmitting method according to claim 12, wherein the basic time and the random time of the unicast frame are the DIFS and random backoff in the IEEE802.11 standard, respectively.

14. The wireless transmitting method according to claim 13, wherein the waiting period for the reception acknowledgment response frame is the SIFS.

15. The wireless transmitting method according to claim 14, wherein the basic time of the broadcast frame is longer than the SIFS and shorter than the DIFS.

16. The wireless transmitting method according to claim 15, wherein the delaying, in a state where the frame type of the transmission frame is the broadcast frame with the waiting period thereof that is shorter than the DIFS, even in a state where the frame type of a next transmission frame scheduled to be next is the broadcast frame, controls the waiting period for the next transmission frame to be equal to or longer than the waiting period for the unicast frame.

17. The wireless transmitting method according to claim 16, wherein delaying controls delaying of the transmission of the broadcast transmission frame for longer than the waiting period for the unicast frame in accordance with a timing at which the another device delays transmission of a broadcast transmission frame for longer than the waiting period for the unicast frame.

18. The wireless transmitting method according to claim 11, wherein the reception acknowledgment response frame is an ACK frame in the IEEE802.11 standard.

* * * * *